(12) United States Patent
Miller (10) Patent No.: US 8,483,609 B2
(45) Date of Patent: Jul. 9, 2013

(54) INTERFERENCE RESISTANT SATELLITE LINK POWER CONTROL USING UPLINK NOISE MEASUREMENTS

(75) Inventor: Mark J. Miller, Vista, CA (US)

(73) Assignee: ViaSat, Inc., Carlsbad, CA (US)

( * ) Notice: Subject to any disclaimer, the term of this patent is extended or adjusted under 35 U.S.C. 154(b) by 480 days.

(21) Appl. No.: 12/831,966

(22) Filed: Jul. 7, 2010

(65) Prior Publication Data

US 2011/0009055 A1    Jan. 13, 2011

Related U.S. Application Data (60) Provisional application No. 61/224,345, filed on Jul. 9, 2009, provisional application No. 61/223,878, filed on Jul. 8, 2009, provisional application No. 61/224,355, filed on Jul. 9, 2009.

(51) Int. Cl.
*H04B 7/185* (2006.01)

(52) U.S. Cl.
USPC ......... 455/13.4; 455/12.1; 455/427; 370/316; 370/318

(58) Field of Classification Search
USPC ............... 455/12.1–13.4, 427–430; 370/316, 370/318
See application file for complete search history.

(56) References Cited

U.S. PATENT DOCUMENTS

| | | | |
|---|---|---|---|
| 4,941,199 | A | 7/1990 | Saam |
| 2006/0030351 | A1 | 2/2006 | Miller et al. |
| 2006/0292990 | A1 | 12/2006 | Karabinis et al. |
| 2007/0087690 | A1 | 4/2007 | Karabinis |
| 2009/0195444 | A1 | 8/2009 | Miller |
| 2010/0128661 | A1 | 5/2010 | Becker et al. |

FOREIGN PATENT DOCUMENTS

| | | |
|---|---|---|
| EP | 0079612 A1 | 5/1983 |
| EP | 0707389 A2 | 4/1996 |
| EP | 1049269 A2 | 11/2000 |
| EP | 1168671 A2 | 1/2002 |
| WO | 2009/0072731 A1 | 6/2009 |

OTHER PUBLICATIONS

U.S. Appl. No. 12/831,972, filed Jul. 7, 2010, Miller et al.
U.S. Appl. No. 12/831,958, filed Jul. 7, 2010, Miller et al.
European Search Report for European Application No. 10168863.8, mailed on Jun. 27, 2012, 7 pages.
European Search Report for European Application No. 10169099.8, mailed on Jun. 28, 2012, 7 pages.
Non-Final Office Action of Jul. 18, 2012 for U.S. Appl. No. 12/831,958, 25 pages.
Notice of Allowance of Nov. 8, 2012 for U.S. Appl. No. 12/831,958, 25 pages.

*Primary Examiner* — Raymond Dean
(74) *Attorney, Agent, or Firm* — Kilpatrick Townsend & Stockton LLP (57) ABSTRACT

A method for determining EIRP of user terminals in a satellite communications system comprises measuring a return uplink thermal noise at one or more frequencies, obtaining a target return uplink signal density relative to thermal noise density, and determining a target signal power at a gateway in the satellite communications system for one or more frequency channels. The target signal power may be based at least in part on the return uplink thermal noise and the target return uplink signal density relative to the thermal noise density. The method also comprises obtaining a message signal power at the gateway of one or more messages from a user terminal, and determining the EIRP of the user terminal based at least in part on a difference between the target signal power and the message signal power.

18 Claims, 8 Drawing Sheets

INTERFERENCE RESISTANT SATELLITE LINK POWER CONTROL USING UPLINK NOISE MEASUREMENTS

CROSS-REFERENCES TO RELATED APPLICATIONS

The present application claims benefit of priority under 35 U.S.C. 119(e) of U.S. Provisional Application Nos. 61/224,345, filed Jul. 9, 2009, entitled "Interference Resistant Satellite Link Power Control Using Uplink Noise Measurements;" 61/223,878, filed Jul. 8, 2009, entitled "Interference Resistant Satellite Link Power Control Using Downlink Beacon;" and 61/224,355, filed Jul. 9, 2009, entitled "MF-TDMA Satellite Link Power Control;" the contents of which are incorporated herein by reference in their entirety.

The following U.S. nonprovisional patent applications, including the present application, are being filed concurrently, and the disclosure of the other applications are incorporated by reference in the present application in their entirety for all purposes:

U.S. Nonprovisional patent application Ser. No. 12/831,958, filed Jul. 7, 2010, entitled "Interference Resistant Satellite Link Power Control Using Downlink Beacon".

U.S. Nonprovisional patent application Ser. No. 12/831,972, filed Jul. 7, 2010, entitled "MF-TDMA Satellite Link Power Control".

U.S. Nonprovisional patent application Ser. No. 12/831,966, filed Jul. 7, 2010, entitled "Interference Resistant Satellite Link Power Control Using Uplink Noise Measurements".

FIELD OF THE INVENTION

The present invention relates generally to satellite communications systems. More particularly, the present invention relates to methods and apparatuses for providing return link power control in satellite communications systems.

BACKGROUND

Satellite communications systems transmit content over large geographic regions. In a typical satellite communications system, end users interface with the system through user terminals. The user terminals communicate, via one or more satellites, with one or more gateway terminals. The gateway terminals may process and route data to and from one or more networks according to various protocols.

A typical hub-spoke spot beam satellite communications system may include a non-processing "bent pipe" spot beam satellite, many user terminals, and a smaller number of gateway terminals. Each user terminal may be connected to a network, such as the internet, via a series of communication links.

A forward link of a satellite communications system may consist of a forward uplink transmission from a gateway terminal to a satellite, a "bent pipe" repeater at the satellite, and a forward downlink transmission to a group of user terminals located in a common spot beam. The forward link may carry data from a gateway terminal to many different user terminals. The forward link may utilize, for example, time Division Multiplexing (TDM) and/or Frequency Division Multiplexing (FDM) of data into RF transmissions.

A return link of a satellite communications system may consist of a return uplink transmission from user terminals in a common spot beam to a satellite, and a return downlink transmission from the satellite to a gateway terminal servicing the spot beam. Transmissions from many user terminals may utilize the return link using Time Division Multiple Access (TDMA), Frequency Division Multiple Access (FDMA), Code Division Multiple Access (CDMA), or the like.

For typical multiple access schemes (e.g., TDMA, FDMA, CDMA, etc.), bandwidth utilization varies with time. As a result, interference to and from other spot beams (both co-polarized and cross-polarized) or even within the same beam may be time varying and dynamic. User terminals generally transmit only when they have data that needs to be transmitted and when they have been assigned one or more slots, frequencies, CDMA codes, or the like for transmission.

In moderate frequency re-use environments that are typical of high capacity spot beam satellites, interference from nearby spot beams operating on the same frequency can cause fluctuation of an end-to-end signal to noise plus interference ratio (SINR). The end-to-end SINR may vary by as much as 5 dB or more. Furthermore, interference can be very dynamic. Bursts in a TDMA system may be as short as 10 μSec or less in duration. Traditional closed loop power control schemes that adjust effective isotropic radiated power (EIRP) at user terminals in response to a measured SINR cannot track dynamic interference because round trip delay through a geosynchronous satellite is typically more than 500 mSec (including processing time at the gateway terminals). As a result, such approaches perform poorly in dynamic and high interference environments.

Thus, there is a need for improved satellite link power control in dynamic and high interference environments.

SUMMARY

The present invention provides improved power control of return link transmissions in satellite communications systems. For example, some embodiments of the present invention adjust an EIRP of each user terminal in the satellite communications system based on a difference between a message signal power and a target signal power. Such embodiments can provide a balance of signal power spectral densities at the satellite. This can reduce interference from other spot beams using the same or similar frequencies and can keep return link satellite EIRP fairly shared among all return link transmissions.

In accordance with an embodiment of the invention, a method for determining EIRP of user terminals in a satellite communications system comprises measuring a return uplink thermal noise at one or more frequencies, obtaining a target return uplink signal density relative to thermal noise density, and determining a target signal power at a gateway in the satellite communications system for one or more frequency channels. The target signal power may be based at least in part on the return uplink thermal noise and the target return uplink signal density relative to the thermal noise density. The method also comprises obtaining a message signal power at the gateway of one or more messages from a user terminal, and determining the EIRP of the user terminal based at least in part on a difference between the target signal power and the message signal power.

In accordance with another embodiment of the invention, a method for controlling power of return link transmissions in a satellite communications system comprises obtaining a return uplink thermal noise estimate at one or more frequencies, where the return uplink thermal noise estimate is based at least in part on a total power measurement from a series of total power measurements, and obtaining a target return uplink signal density relative to thermal noise density. The method also comprises determining a target signal power at the gateway for one or more frequency channels, where the target signal power is based at least in part on the return uplink thermal noise estimate and the target return uplink signal density relative to thermal noise density. The method also comprises obtaining a message signal power at the gateway of a message from a user terminal, and determining the EIRP of the user terminal based at least in part on a difference between the target signal power and the message signal power.

In accordance with another embodiment of the invention, an apparatus for determining EIRP of user terminals in a satellite communications system comprises an obtaining module configured to obtain a return uplink thermal noise estimate, obtaining a target return uplink signal density relative to thermal noise density, and obtain a message signal power at a gateway in the satellite communications system of a message from a user terminal. The apparatus also comprises a determining module configured to determine a target signal power at the gateway based at least in part on the return uplink thermal noise estimate and the target return uplink signal density relative to thermal noise density, and determine the EIRP of the user terminal based at least in part on a difference between the target signal power and the message signal power.

Numerous benefits are achieved using the present invention over conventional techniques. For example, some embodiments provide methods for adjusting the EIRP of each user terminal individually. This can help maintain the balance of signal power spectral densities at the satellite. As another example, some embodiments provide methods for adjusting the EIRP of user terminals based on return uplink noise, while ignoring return downlink propagation losses and dynamic interference. This can also help to provide a balance of signal power spectral densities at the satellite. Depending upon the embodiment, one or more of these benefits may exist. These and other benefits are described throughout the specification and more particularly below.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label with a dash and a second label that distinguishes among the similar components. If only the first reference label is used in the specification, the description is applicable to any one of the similar components having the same reference label irrespective of the second reference label.

DETAILED DESCRIPTION

The present invention provides improved methods and apparatuses for controlling the power of return link transmissions in satellite communications systems. Some embodiments provide methods for adjusting an EIRP of each user terminal in the satellite communications system. The EIRP of a user terminal may be adjusted based on a difference between a signal power of a message sent from the user terminal and a target signal power. The signal power of the message sent from the user terminal may be determined at a gateway demodulator. The target signal power may be determined based on a number of factors including, for example, return uplink thermal noise, target return uplink signal density relative to the thermal noise density, satellite beacon signal power, channel symbol rate, gateway demodulator automatic gain control (AGC), and/or other factors. Such embodiments can improve system performance in dynamic and high interference environments. These and other embodiments of the present invention are described more fully below.

Figure 1:
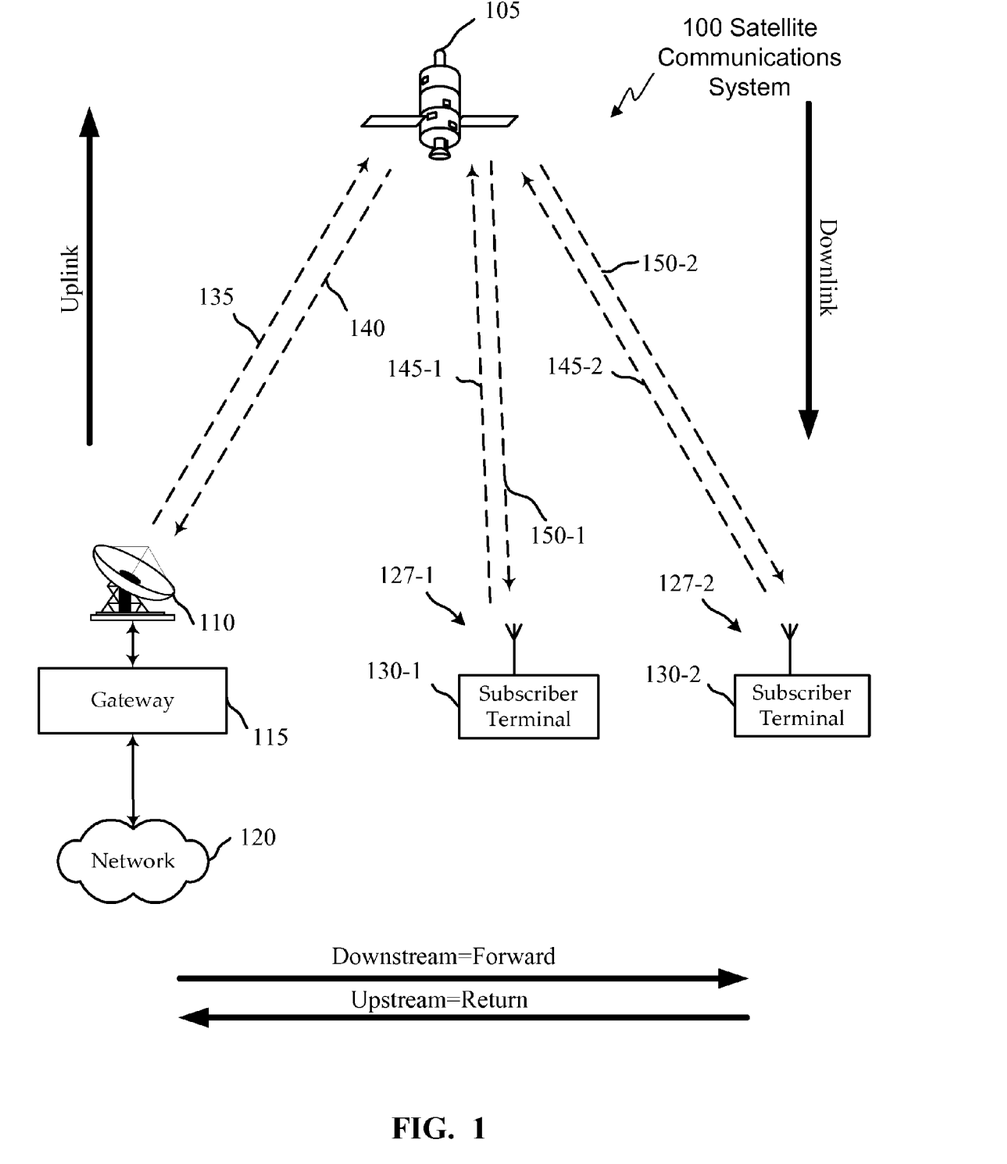
FIG. 1 is a simplified diagram of an exemplary satellite communications system in which the methods and apparatuses of the present invention may be implemented.

FIG. 1 is a simplified diagram of an exemplary satellite communications system 100 in which the methods and apparatuses of the present invention may be implemented. Satellite communications system 100 includes a network 120 interfaced with one or more gateway terminals 115. The gateway terminal 115 is configured to communicate with one or more user terminals 130 via a satellite 105.

The gateway terminal 115 is sometimes referred to as a hub or ground station. The gateway terminal 115 services uplink 135 and downlink 140 to and from the satellite 105. The gateway terminal 115 may also schedule traffic to the user terminals 130. Alternatively, the scheduling may be performed in other parts of the satellite communications system 100 (e.g., at one or more network operations centers (NOC) and/or gateway command centers). Although only one gateway terminal 115 is shown in FIG. 1, embodiments of the present invention may be implemented in satellite communications systems having a plurality of gateway terminals each of which may be coupled to one or more networks.

In some satellite communications systems, there may be a limited amount of frequency spectrum available for transmission. Communication links between the gateway terminal 115 and the satellite 105 may use the same, overlapping, or different frequencies as communication links between the satellite 105 and the user terminals 130. The gateway terminal 115 may be located remote from the user terminals 130 to enable frequency re-use.

The network 120 may be any type of network and can include, for example, the Internet, an IP network, an intranet, a wide-area network (WAN), a local-area network (LAN), a virtual private network (VPN), a virtual LAN (VLAN), a fiber optic network, a hybrid fiber-coax network, a cable network, a public switched telephone network (PSTN), a public switched data network (PSDN), a public land mobile network, and/or any other type of network supporting data communication between devices as described herein. The network 120 may include both wired and wireless connections as well as optical links. The network 120 may connect the gateway terminal 115 with other gateway terminals that may be in communication with the satellite 105 or with other satellites.

The gateway terminal 115 provides an interface between the network 120 and the satellite 105. The gateway terminal 115 may be configured to receive data and information directed to one or more user terminals 130. The gateway terminal 115 may format the data and information for delivery to the respective user terminal(s) 130. Similarly, the gateway terminal 115 may be configured to receive signals from the satellite 105 (e.g., from one or more user terminals 130) directed to a destination accessible via the network 120. The gateway terminal 115 may format the received signals for transmission on the network 120.

The gateway terminal 115 may use an antenna 110 to transmit a forward uplink signal 135 to the satellite 105. In one embodiment, the antenna 110 may comprise a parabolic reflector with high directivity in the direction of the satellite 105 and low directivity in other directions. The antenna 110 may comprise a variety of alternative configurations and include operating features such as high isolation between orthogonal polarizations, high efficiency in the operational frequency bands, low noise, and the like.

The satellite 105 may be a geostationary satellite that is configured to receive the forward uplink signals 135 from the location of the antenna 110. The satellite 105 may use, for example, a reflector antenna, a lens antenna, a phased array antenna, an active antenna, or any other mechanism known in the art for reception of such signals. The satellite 105 may process the signals received from the gateway terminal 115 and forward the downlink signals 150 to one or more of the user terminals 130. The signals may be passed through a transmit reflector antenna (e.g., a phased array antenna) to form the transmission radiation pattern (spot beam). The satellite 105 may operate in a multiple spot-beam mode, transmitting a number of narrow beams each directed at a different region of the earth. This allows segregation of the user terminals 130 into the various narrow beams.

The satellite 105 may be configured as a "bent pipe" satellite. In this configuration, the satellite 105 may perform frequency and polarization conversion of the received carrier signals before re-transmission of the signals to their destination. A spot beam may use a single carrier, i.e., one frequency, or a contiguous frequency range per beam. A variety of physical layer transmission modulation and coding techniques may be used by the satellite 105 (e.g., adaptive coding and modulation).

The satellite communications system 100 may use a number of network architectures consisting of space and ground segments. The space segment may include one or more satellites while the ground segment may include one or more user terminals, gateway terminals, network operations centers (NOCs), and satellite and gateway terminal command centers. The segments may be connected via a mesh network, a star network, or the like as would be evident to those skilled in the art.

The forward downlink signals 150 may be transmitted from the satellite 105 to one or more user terminals 130. The user terminals 130 may receive the downlink signals 150 using an antenna 127. In one embodiment, the antenna 127 and the user terminal 130 together comprise a very small aperture terminal (VSAT), with the antenna 127 measuring approximately 0.6 meters in diameter and having approximately 2 watts of power. In other embodiments, a variety of other types of antennas 127 may be used at the user terminals 130 to receive the downlink signals 150 from the satellite 105. Each of the user terminals 130 may comprise a single user terminal or, alternatively, may comprise a hub or router (not pictured) that is coupled to multiple user terminals. Each user terminal 130 may be connected to various consumer premises equipment (CPE) comprising, for example, computers, local area networks, internet appliances, wireless networks, and the like.

In a manner similar to that described above, the user terminals 130 may use return link transmissions to communicate with the gateway terminal 115 or the network 120 via the satellite 105. The return link may consist of return uplink transmissions 145 from the user terminals 130 to the satellite 105, and return downlink transmissions 140 from the satellite 105 to the gateway terminal 115. The gateway terminal 115 may format the received signals for transmission to one or more destinations that are accessible via the network 120.

In accordance with an embodiment of the present invention, the signal power of the return link transmissions may be controlled by adjusting the EIRP of the user terminals 130. The EIRP of the user terminals 130 may be adjusted based on a difference between a signal power of messages sent from the user terminals 130 and a target signal power (denoted P*). The signal power of the messages sent from the user terminals 130 may be determined at the gateway 115. P* may be determined, for example, based on return uplink thermal noise, a target return uplink signal density relative to the thermal noise density, a satellite beacon signal power, a channel symbol rate, a gateway demodulator AGC, and/or other factors.

Signal Power of Messages Sent from User Terminals

In accordance with an embodiment of the present invention, a signal power of messages sent from the user terminals 130 may be used in return link power control. The messages may be data transmissions or other messages and may be sent at a specified rate. The messages will be referred to broadly throughout this specification as periodic management messages (PMMs). In a particular embodiment, a PMM may be sent from each user terminal every 320-640 mSec (1.56-3.13 Hz). This frequency is generally sufficient to provide accurate tracking of dynamic uplink fades in return link transmissions of typical satellite communications systems. Of course, other rates may be specified based on the particular application. The user terminals 130 may transmits the PMMs using the same EIRP that is normally used for data transmissions. In addition to being used for return link power control, the PMMs may also be used for non-linearity avoidance, TDMA synchronization maintenance, keep alives, bandwidth requests, forward link SINR reporting, and other communications.

Demodulators at the gateway 115 may be used to provide estimates of received signal power (or message signal power) for each PMM. The estimated message signal power may be proportional to a log of a received power of a desired signal (Log (S)). This number may be proportional to a dB value. The message signal power estimates may be compared to the target signal power (P*) and the difference used to adjust the EIRP of the user terminal 130 that sent the PMM. Estimates of message signal power for PMMs that contain bit errors, as determined, for example, by a cyclic redundancy check (CRC) within the PMM, may be ignored.

The demodulators may also provide estimates of total received power and received SINR. The total received power estimate may be proportional to a log of the total received power $(Log(S+N+I)^2)$. The received SINR may be proportional to a log of the SINR $(Log(S/(N+I)))$. These numbers may be proportional to dB values.

In addition to the above estimates, the demodulators may also provide other information about each PMM such as a frequency of arrival error, a time of arrival error, and an output dither estimate. The output dither estimate may be, for example, proportional to a log of a ratio of signal power in even numbered symbols to signal power in odd numbered symbols. This information may or may not be used in return link power control.

Target Signal Power

The target signal power (P*) may be a desired value of the message signal power at a demodulator of the gateway 115. In an embodiment, P* may be calculated for each channel in the return link. The return link may be segmented into one or more return channel groups (RCGs) spanning all or a portion of the return link bandwidth. In one embodiment, for example, the return link bandwidth may span 500 MHz and be segmented into four RCGs each spanning 125 MHz. The gateway 115 may include one or more demodulators, and each demodulator may provide burst demodulation for each carrier in one or more of the RCGs.

In accordance with the various embodiments of the present invention, P* may be a function of one or more of the following factors: (1) the return uplink thermal noise, (2) the target return uplink signal density relative to the thermal noise (Es/No*), (3) the satellite beacon signal power, (4) the gateway demodulator AGC, (5) the channel symbol rate, and/or other factors.

Merely by way of example, in one embodiment P* may be calculated for each channel (from k=0 to K−1) of an RCG in the return link using the following equation:

$$P^*(k) = Es/No^* + N_{poly}(k) + 10 \cdot \text{Log10}(R_{sym}(k)) - \tag{1}$$
$$N_{bias} + (B_{now} - B_{init}(k)) \cdot \left(\frac{f_k}{f_b}\right)^2 - A_{now}$$

where, $P^*(k)$ is the target signal power for channel k (in dB or other units);

Es/No* is the target return uplink signal density relative to the thermal noise density (in dB or other units). Es/No* is typically the same for all channels and may be determined, for example, as part of a system design or based on actual or expected operation of the satellite communications system 100;

$N_{poly}(k)$ is a polynomial representing return uplink thermal noise for channel k;

$R_{sym}(k)$ is the symbol rate for channel k;

$N_{bias}$ is a correction factor to reduce bias in noise power measurements. The bias is predominantly due to return downlink thermal noise and forward link interference. $N_{bias}$ may vary between spot beams but is generally the same for all channels within a particular spot beam;

$B_{now}$ is the satellite beacon signal power (in dB or other units);

$B_{init}(k)$ is the filtered satellite beacon signal power during $N_o$ measurements (in dB or other units). $B_{init}(k)$ is typically not a function of channel for quiet time operation but may be a function of channel for self generating operation;

$f_k$ is a center frequency at the return downlink of channel k;

$f_b$ is a frequency at the return downlink of the satellite beacon; and $A_{now}$ is gateway demodulator AGC attenuation (in dB or other units).

The value of P* may be re-calculated at a specified rate or upon occurrence of a specified event. In one embodiment, for example, P* may be re-calculated when there is a change in $B_{now}$ or $A_{now}$ values.

(1) Return Uplink Thermal Noise

Return uplink thermal noise may be used to determine P* in accordance with an embodiment of the invention. The return uplink thermal noise may be determined using a quiet time approach, a self generating approach, and/or other approaches.

The quiet time approach involves periodic total power measurements at a demodulator of the gateway 115 to establish a level of return uplink thermal noise. The total power measurements may be performed during a short quiet interval during which transmissions in the satellite communications system 100 are limited or stopped. In one embodiment, for example, the quiet interval is created for a particular RCG by:

Not scheduling any transmissions in the particular RCG.

Stopping transmissions in all spot beams serviced by the satellite 105 on forward carriers that are co-frequency with the particular RCG. This can reduce or eliminate forward link interference.

Not scheduling transmissions in spot beams serviced by the satellite 105 in RCGs that are co-frequency with the particular RCG. This can reduce or eliminate return link interference.

Not scheduling transmissions in RCGs that utilize the same satellite traveling wave tube amplifier (TWTA) as the particular RCG. This can reduce or eliminate intermodulation and adjacent channel interference.

The above steps can be used to create a quiet interval. During the quiet interval, the demodulator can perform total power measurements at all frequencies or channels within the particular RCG. The quiet interval may be scheduled at a specified rate or upon occurrence of a specific event. In one embodiment, for example, the quiet interval may be scheduled and the total power measurement performed every 6-18 hours. Alternatively, the total power measurements may be performed continuously and only the values obtained during the quiet interval may be used to determine return uplink thermal noise.

In an embodiment of the present invention, the above steps are executed using script files that may be distributed, for example, from one or more network operation centers (NOCs) or gateway command centers to the gateways 115 in the satellite communications system 100. The actions may be set to occur at a specific time. The forward links from the gateways 115 may be synchronized to time of day (TOD) via global positioning system (GPS) time. The return links may be synchronized to the forward links such that all of the links are synchronized to TOD.

The total power measurements may be multiplied by a constant (C) to convert the values to dB. The results may be added to current AGC attenuation values (also in dB) to provide adjusted values denoted $P_c(k)$. In some embodiments, the adjusted values are not used if AGC attenuation changes were made during the quiet interval in which the total power measurements were made. Because software control of the AGC attenuator may not operate in precise synchronism with the demodulator, it may not be possible to know exactly when an AGC attenuation change took affect. It may be determined, however, whether it was possible for an AGC attenuation change to take place during the measurement interval. If an AGC attenuation change was possible, previous $P_c(k)$ values may be used that were acquired during an interval in which no AGC attenuation changes were made. This may result in one or more missed samples as a result of an AGC attenuation change. This is generally okay since AGC attenuator changes are infrequent. This process provides P$_c$(k) values even when AGC attenuator values change.

In an embodiment, it may be possible to determine that the quiet interval encompasses a specified number of total power measurements. The minimum total power measurement may be selected for each channel in the RCG as the noise power estimate for that channel. The noise power estimate in dB for channel k may be denoted N$_m$(k). The noise power estimate may be normalized by symbol rate (R$_{sym}$(k)) to get a noise density measurement (N$_o$) for each channel.

Each N$_m$(k) value may be associated with a physical channel having a center frequency f$_k$. The center frequency f$_k$ may be an offset from a lower edge of the RCG (as shown at IF) measured in Hz. The center frequency f$_k$ may be normalized by bandwidth of the RCG (W$_{RCG}$).

The normalized frequencies and noise power values form K pairs of data points [f$_k$/W$_{RCG}$, N$_m$(k)/R$_{sym}$(k)] may be used to fit a curve to the data. In one embodiment, the result is four coefficients (a$_0$, a$_1$, a$_2$, a$_3$) of a 3$^{rd}$ order polynomial that is used to describe the noise density at any frequency within the RCG. This polynomial may be used to generate return uplink noise density values at the center frequencies of each of the physical channels using the following equation:

$$N_{poly}(f_k) = a_3 x^3 + a_2 x^2 + a_1 x + a_0 \big|_{x=\frac{f_k}{W_{RCG}}} \quad (2)$$

This provides filtering of the measurements across frequency and re-calculation of the noise power at different frequencies (which may be needed for changes in channelization). The generation of the coefficients (a$_0$, a$_1$, a$_2$, a$_3$) may be performed using a standard least squares algorithm or other methods as would be appreciated by one of ordinary skill in the art.

The total power measurements used for the quiet time approach are preferably made during a period when there is no rain affecting the return downlink. Under such conditions the total power measurements will typically be dominated by return uplink noise. If there is rain on the return downlink, it may be preferable to not use the total power measurements. The rain can be detected using beacon signal power measurements as explained more fully below.

The self generating approach may be used in conjunction with or independent of the quiet time approach. The self generating approach does not require forward or return link quiet intervals. In an embodiment, the self generating approach involves performing total power measurements using a demodulator (or MCD) at the gateway 115. The measurements may be performed at a specified rate. For example, in one embodiment the total power is measured for each physical channel in the RCG at a rate of about once every 118 mSec.

In an embodiment, a measurement sample may include minimum total power values for each channel within an RCG that are obtained during a specified interval. For example, the specified interval may be a specified time duration or a specified symbol interval. The total power measurements may be asynchronous with arrival of RF bursts. The minimum total power values may used as an indication of return uplink thermal noise since the minimum will typically occur when there is no transmission and interference is minimal. Merely by way of example, the minimum total power value for a 20 Msps channel may be a minimum of 288 measurements performed during the specified interval. The minimum total power value for a 625 ksps channel may be a minimum of 9 measurements performed during the specified interval.

Figure 2:
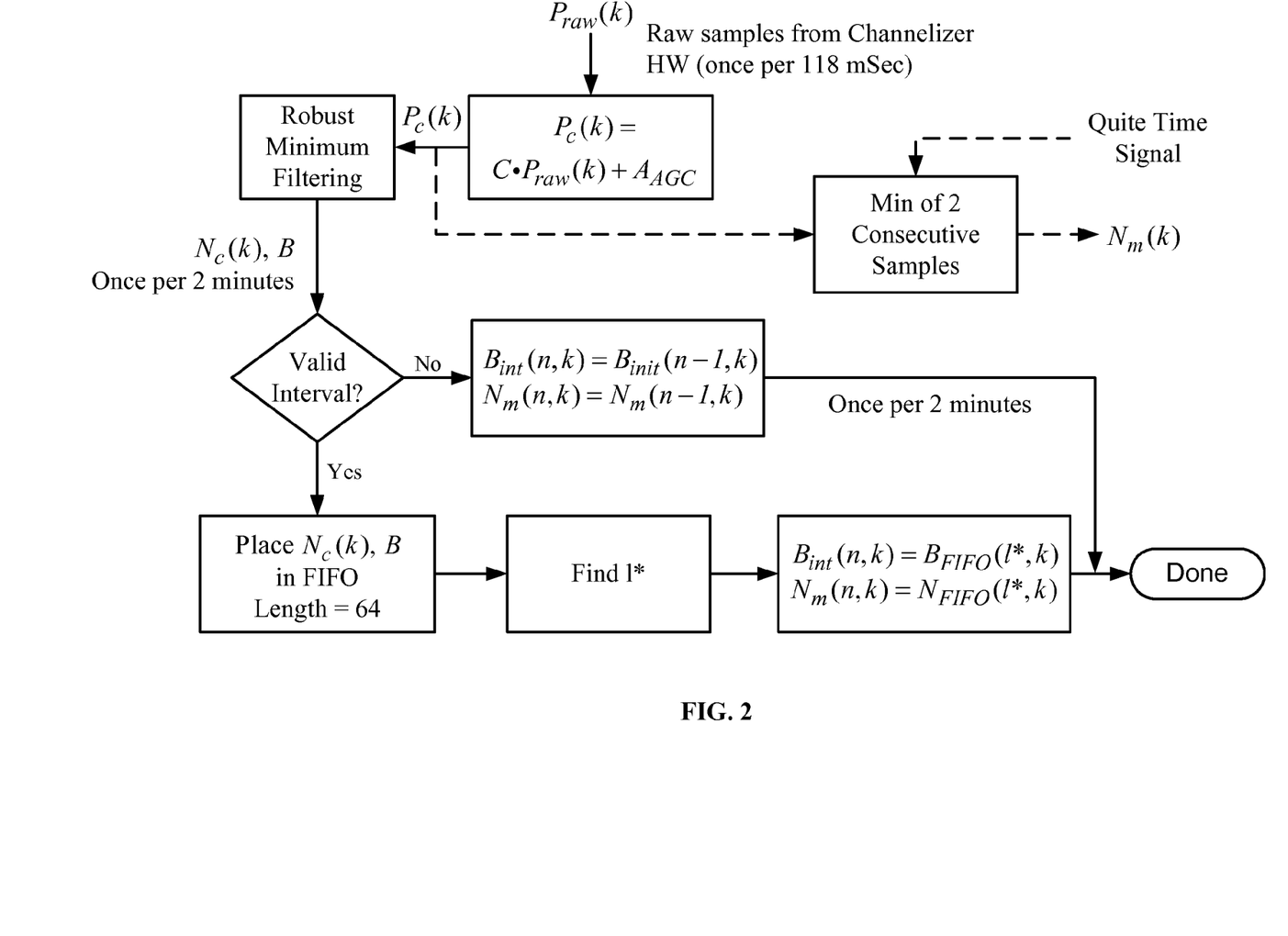
FIG. 2 is a simplified flowchart illustrating exemplary methods of determining uplink noise in accordance with an embodiment of the present invention.

FIG. 2 is a simplified flowchart illustrating exemplary methods of determining uplink noise in accordance with an embodiment of the present invention. The dashed lines illustrate generation of N$_m$(k) using the quiet time approach described above. In FIG. 2, the adjusted total power measurements P$_c$(k) are generated by converting P$_{raw}$(k) values to dB (multiply by C) and adding the current AGC attenuation values. The P$_c$(k) values include signal, noise, and interference components. For the self generating approach, the P$_c$(k) values are processed to produce N$_m$ and B$_{init}$ values. B$_{init}$ is a filtered satellite beacon signal power averaged over a period of time to remove variations due to scintillation. New N$_m$ and B$_{init}$ values may be generated at a specified rate or upon occurrence of a particular evet. In one embodiment, for example, new N$_m$ and B$_{init}$ values may be generated approximately once every 2 minutes. The new values may be denoted N$_m$(n,k) and B$_{init}$(n,k) to indicate both temporal dependence (n) and frequency dependence (k). These values may be used to generate the polynomial based values N$_{poly}$(k).

Note that B$_{init}$ has a dependence on k since the N$_o$ estimates for each channel are not necessarily obtained at the same time. This is in contrast to the quiet time approach where the N$_o$ estimates are obtained at approximately the same time for each RCG and thus B$_{init}$ is not a function of k.

Figure 3:
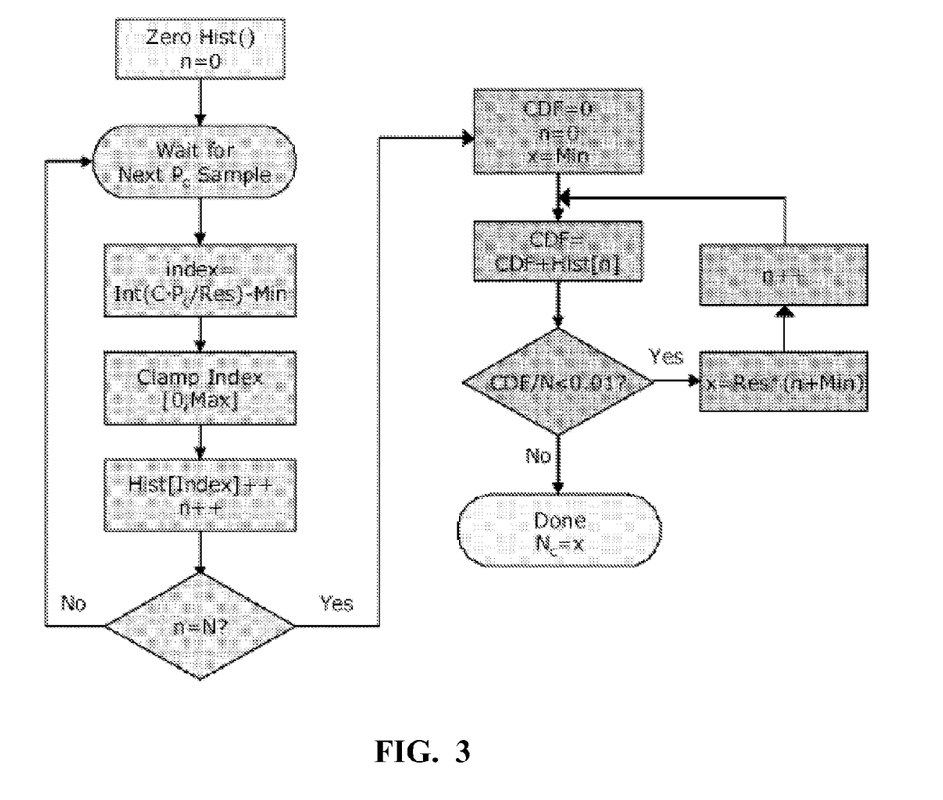
FIG. 3 is a simplified flowchart illustrating an exemplary method of filtering noise measurements in accordance with an embodiment of the present invention.

The robust minimum filtering block illustrated in FIG. 2 may be used to generate a minimum value over a specified number of measurement samples (or the samples obtained during a specified measurement interval). In this embodiment, the minimum value may be a value that is statistically near the minimum value rather than the actual minimum value of the measurements. For example, in one embodiment a minimum value may be generated using about 1024 measurement samples. A minimum filtering process may be used to determine, for example, the 0.01 point in a cumulative distribution function (CDF). The 0.01 point (x) is the value where 99% of the measurement samples are greater than x. The value x may used as an indication of return uplink thermal noise. This value may be found by generating a histogram using the measurement samples collected during the measurement interval and integrating to get the CDF. The process is depicted in FIG. 3, which is a simplified flowchart illustrating an exemplary method of filtering noise measurements in accordance with an embodiment of the present invention. In FIG. 3, the light shaded blocks relate to generation of the histogram (performed while samples arrive), while the dark shaded blocks relate to generation of the CDF and generation of the robust minimum value (N$_c$(k)). In an exemplary embodiment, the resolution (Res) of the histogram may be approximately 0.1 dB, the number of samples collected (N) may be approximately 1024, and the parameters Min and Max may be used to define the range over which the histogram is accumulated. The constant C is a value used to convert the total power measurements into dB.

In addition to N$_c$(k), the robust minimum filtering block may provide a satellite beacon signal power (B). In an embodiment, the parameter B is an average of the parameter B$_{now}$ over the histogram interval. B$_{now}$ is a normalized satellite beacon signal power that may be determined using satellite beacon signal power measurements from a beacon receiver (or MCD). The value of B$_{now}$ may be distributed to the other MCDs in the gateway 115. B$_{now}$ may be averaged by the MCDs over the histogram interval to provide B.

The measurement samples obtained during a histogram interval of the robust minimum filtering process may be considered invalid, or the samples may not be collected, if one or more of the following conditions exist:

There is rain on the return downlink or it is raining at the gateway site. This may be determined by a Rain_attn flag from the beacon receiver.

The satellite beacon signal power has changed since the last histogram interval. In an embodiment, this may be determined using the following equation:

$$|B(n)-B(n-1)|>\gamma_{change} \qquad (4)$$

where the quantity B(n) is the averaged $B_{now}$ over the current histogram interval (e.g., current 2 minute interval) and B(n−1) is the averaged $B_{now}$ over the last histogram interval (e.g., previous 2 minute interval). In an embodiment, the value of $\gamma_{change}$ is approximately 0.5 dB. Equation (4) mat by used to detect rain fade events before the Rain_attn flag is set.

If the current histogram interval is determined to be invalid, the quantities $N_m(n,k)$ and $B_{init}(n,k)$ may be set to the values determined during a previous valid histogram interval. As illustrated in FIG. 2, if the current histogram interval is determined to be valid, outputs from the robust minimum filtering block are input to a length=64 FIFO. In an embodiment, the FIFO locations may be indexed from j=0 to j=63, and a location j* that minimizes the quantity $N_{FIFO}(j,k)$ over all 64 FIFO locations may be determined. The values at location j* may be used as new quantities for $N_m(n,k)$ and $B_{init}(n,k)$. This process may be used to determine a minimum of all histogram noise power estimates over a specified period (e.g., 2 hours) of clear sky operation.

In an embodiment, the $N_m(k)$ values may be used to determine coefficients of a $3^{rd}$ order polynomial that may be used to generate return uplink noise density values at the center frequencies of each of the physical channels. The resulting polynomial may be evaluated at each channel location k to provide $N_{poly}(k)$ values to be used in Equation (1). The process for determining the $N_{poly}(k)$ values may be essentially the same as that used in the quiet time approach described above. In some embodiments, new $N_{poly}(k)$ values may not need to be determined if the noise power estimates $N_m(k)$ determined from the current histogram interval are the same as those from the previous histogram interval. In such a situation, the $N_{poly}(k)$ values will not change.

The self generating approach described above may be used to find the minimum noise power estimates over a specified period of clear sky operation. During periods when the return link channels are not heavily loaded, the self generating approach has a good chance of providing an $N_o$ measurement that was obtained when there were no transmissions and no dynamic interference on the return link. At such times, the $N_o$ measurement will consist primarily of return uplink thermal noise, return downlink thermal noise, and forward link interference. When $N_o$ is measured during periods when there is no rain on the return downlink, the return uplink thermal noise will dominate the return downlink thermal noise. The forward link interference, however, may cause the return uplink thermal noise to be over estimated. In some embodiments, the forward link interference may be estimated from link budgets and antenna patterns so that it can be removed from the $N_{bias}$ term in Equation (1). In other embodiments, the forward link interference may result in an overestimate of the return uplink thermal noise and a higher P*(k) value. This may increase margin for links in the beam and increase interference in other beams.

During initial startup of a demodulator or MCD at the gateway 115, an initial $N_m(k)$ estimate for each RCG channel may be determined as the minimum value obtained from a specified number of adjusted total power measurements $P_c(k)$. In an embodiment, for example, a minimum $P_c(k)$ value from 16 consecutive $P_c(k)$ values may be used as an initial $N_m(k)$ estimate. Similarly, an initial $B_{init}$ value may be determined as the average of the $B_{now}$ measurements over the interval used to provide the initial $N_m(k)$ estimate. Also, $N_{poly}(k)$ may be set to $N_m(k)$, and the positions of the FIFOs may be initialized using the initial $N_m(k)$ and $B_{init}$ values.

In an embodiment, the initialization procedure described above can initialize the robust minimum filtering process in approximately 2 seconds. If no transmissions are scheduled during this time period, the initial estimates should reflect a low noise and low interference condition. If the initial estimates are too high, the initial EIRP at the user terminals 130 will be high and may increase interference to other beams. This should improve as new $N_m(k)$ and $B_{init}$ values are determined.

(2) Target Es/No*

The target Es/No* may also be used to determine P* in accordance with an embodiment of the invention. The target Es/No* may be determined, for example, as part of the system design or based on actual or expected operation of the satellite communications system 100. In one embodiment, the target Es/No* may be selected using a link analysis factoring in desired end to end link characteristics and off-axis emissions of the user terminals 130. Return downlink EIRP for each carrier and TWTA output backoff (OBO) may be calculated using satellite transponder saturation flux density (SFD) and beam gain to noise temperature ratio (G/T).

When a user terminal 130 comes on-line in the satellite communications system 100, a two-dimensional (e.g., time and power) search may be employed to set the initial EIRP of the user terminal 130 so that the satellite return link Es/No is approximately equal to the target Es/No* value. Embodiments of the present invention may be used to adjust the EIRP of each user terminal 130 so that the received signal power remains approximately equal to the target signal power P* (and hence the satellite return link Es/No remains approximately equal to the target Es/No* value).

(3) Satellite Beacon Signal Power

Satellite beacon signal power may also be used to determine P* in accordance with an embodiment of the present invention. The satellite beacon signal power may be used, for example, to separate propagation loses affecting a return uplink transmission from those affecting return downlink transmissions. In some embodiments, the return link power control may ignore return downlink propagation loses (e.g., rain). This helps balance signal power spectral densities at the satellite.

A beacon receiver (or demodulator) at the gateway 115 may provide an absolute level of the satellite beacon signal power (or estimates of a log of the satellite beacon signal power). These satellite beacon signal power measurements may be provided in units proportional to dB's. The satellite beacon signal may be selected to be at or near the frequency of the downlink band. For example, in one embodiment the beacon signal may have a frequency of between about 19.7-20.2 GHz. Also, the power measurements may be performed at a specified rate. For example, in one embodiment the beacon receiver may provide the measurements at a rate of approximately 15 Hz. This rate is generally sufficient to capture variations due to atmospheric scintillation.

The satellite beacon signal power measurements may be filtered so that they have insignificant variance due to thermal noise and are frequent enough to capture the beacon power variation due to fading, scintillation, and analog hardware gain drift. For example, the power measurements may be normalized to account for AGC attenuation of the beacon receiver. This provides a normalized beacon power $B_{now}$. Additional filtering and sample rate reduction may be used to generate a filtered beacon power $B_{filt}$. $B_{filt}$ may be determined at a rate of about once every 10-15 seconds to reduce variation due to scintillation. A minimum filtered value ($B_{min}$) may be determined at a rate of about once every 1-3 minutes. A clear sky level of the satellite beacon signal power ($B_{max}$) may be a maximum of the $B_{min}$ values over, for example, a 48-96 hour interval.

The beacon receiver may also provide a total power estimate, a frequency error estimate, a receiver lock indication, and other values. The total power and frequency error estimates may be provided at a rate synchronous with the satellite beacon signal power estimate. The lock indication may be provided as an interrupt anytime lock status changes.

Figure 4:
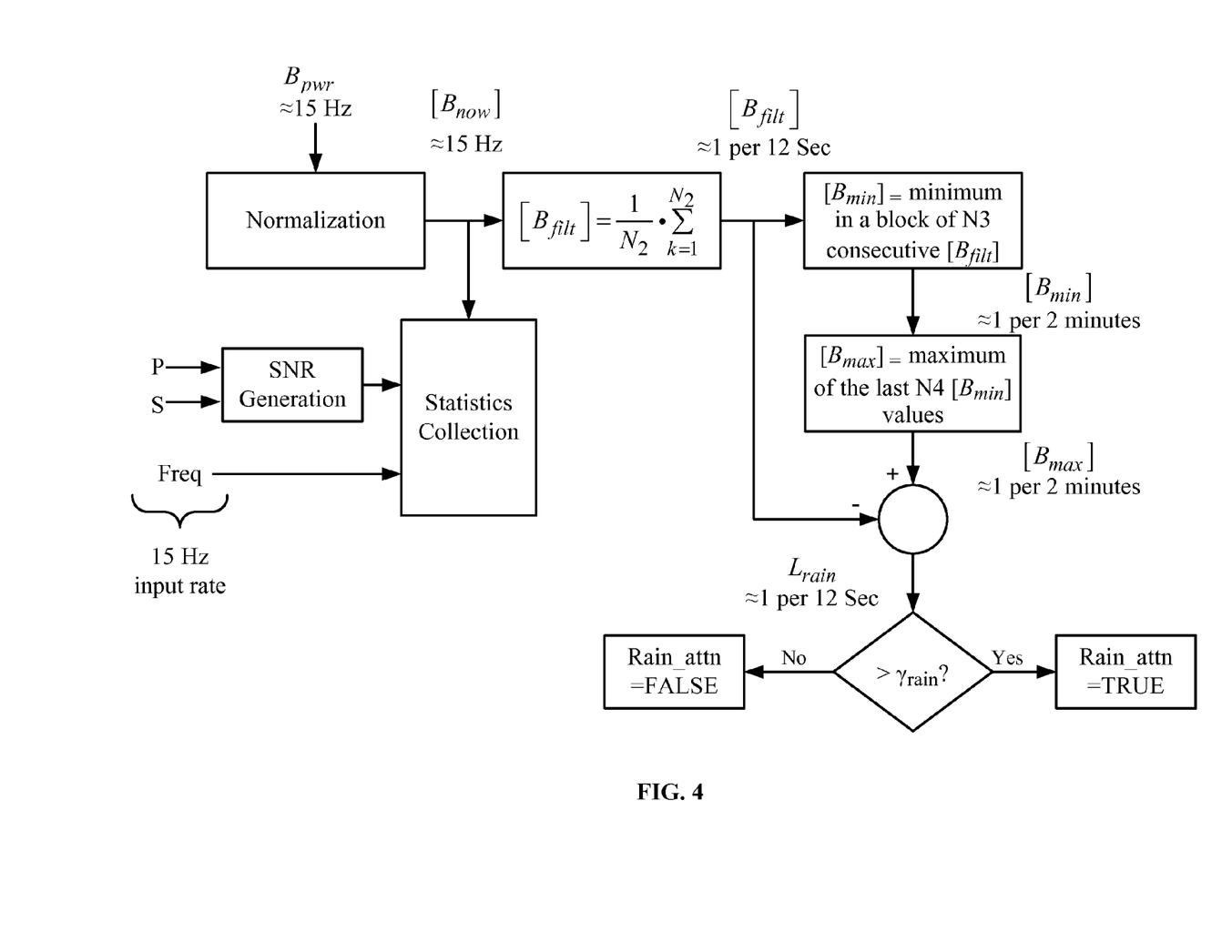
FIG. 4 is a simplified flowchart illustrating an exemplary method of satellite beacon signal processing in accordance with an embodiment of the present invention.

FIG. 4 is a simplified flowchart illustrating an exemplary method of satellite beacon signal processing in accordance with an embodiment of the present invention. The operations within the normalization block depend on whether the AGC attenuation of the beacon receiver has changed during the interval used to generate the sample $B_{pwr}(n)$. In an embodiment, $B_{now}$ is determined using one of the following equations:

$$B_{now}(n) = C \cdot B_{pwr}(n) + A_{now}(n) \text{—used if no AGC change has occurred during interval;} \quad (5)$$

$$B_{now}(n) = C \cdot B_{now}(n-1) \text{—used if AGC has changed during interval;} \quad (6)$$

where $B_{pwr}(n)$ is the current sample provided by the beacon receiver, $A_{now}(n)$ is the current AGC attenuation of the beacon receiver (value used during the interval to generate $B_{pwr}(n)$), and C is a constant to map FPGA units into dB. The interval used to generate $B_{pwr}(n)$ may be, for example, a 66.7 msec interval preceding the sample (for a 15 Hz input rate). For each sample it may be determined whether it was possible for an AGC attenuation change to take place in the interval used to generate the sample. Equation (6) may be used to determine $B_{now}(n)$ if it was possible for an AGC attenuation change to take place during the interval used to generate the sample. This may result in one or more missed samples as a result of an AGC attenuation change. This is generally okay since AGC attenuator changes are infrequent. This process provides $B_{now}(n)$ values even when AGC attenuation values change.

In an embodiment, a difference between the $B_{max}$ and the $B_{filt}$ values may be used to provide a return downlink rain fade estimate ($L_{rain}$). $L_{rain}$ may be compared with a threshold to provide a rain fade detector and set the Rain_attn flag.

(4) Gateway Demodulator AGC

Gateway demodulator AGC may also be used to determine P* in accordance with an embodiment of the present invention. In some embodiments, the return link power control may be sensitive to demodulator IF gain when absolute message signal power measurements are used. The gateway demodulator AGC may provide periodic adjustments to the demodulator IF gain. The two modes of demodulator AGC operation (initial and steady state) are described below.

Initial demodulator AGC operation is typically performed upon power up before any transmissions have been scheduled. The initial demodulator AGC operation may include a sequence of power measurements and demodulator (or MCD) attenuation settings. The RCG channelization may have any configuration during the initial demodulator AGC operation.

During initial demodulator AGC operation, raw power estimates $P_{raw}(k)$ may be provided at a specified rate. For example, in an embodiment the raw power estimates are provided at a rate of approximately once per 118 mSec. The total power in, for example, a 125 MHz A/D sampling bandwidth may be determined using the following equation:

$$P_{MCD} = 10 \log_{10}(P_{PRG1} + P_{RCTG2}) \quad (7)$$

where $P_{RCG1}$ and $P_{RCG2}$ may be total power estimates (not in dB) in RCG1 and RCG2. The value of PRCG1 may be determined from the raw power estimates using the following equation:

$$P_{RCG1} = \sum_{k=0}^{K-1} 10^{C \cdot P_{raw1}(k)/10} \quad (8)$$

Note that the total power estimate on channel k of $P_{RCG1}$ ($P_{raw}(k)$) may be provided in units proportional to dB. Hence the multiplicative constant C to convert to dBs and the exponential before summing. The equation used to determine $P_{RCG2}$ may be similar to Equation (8) replacing $P_{raw1}(k)$ with $P_{raw2}(k)$. Equation (7) provides total MCD power, which may be related to total power at the MCD A/D converters by a fixed constant ($P_{A/D} = P_{MCD} - C1$, where C1 may be the net gain (in dB) of the MCD digital processing. Note that the gain C1 can be defined so that the A/D power ($P_{A/D}$) is the A/D converter operating backoff.

AGC operations for one iteration may be completed by determining a power level error signal and adjusting the demodulator IF gain using the following equations:

$$\text{Err} = (P_{A/D} + E_s/N_{o\_init}) - P^*_{A/D} \quad (9)$$

$$\text{Atten}_{IF} = \text{Atten}_{IF} + \text{Err} \quad (10)$$

where $P^*_{A/D}$ is a desired signal power level at the A/D converter assuming carriers are present on all channels in both RCGs, and $E_s/N_{o\_init}$ is a fixed value, for example, 10 dB.

The attenuation in equation (10) may be a floating point value and may be rounded to the resolution of the demodulator attenuator ($q_{AGC}$). The actual attenuation value is then determined using the following equation:

$$A_{HW} = q_{AGC} \cdot \text{round}\left(\frac{\text{Atten}_{IF}}{q_{AGC}}\right) \quad (11)$$

where $A_{HW}$ may be partitioned across several attenuators as a function of the total attenuation.

T_AGC seconds after the attenuation values are changed the measure and set process may be repeated. The iterations may be repeated, for example, until two consecutive error measurements (Equation (9)) have absolute values $<\gamma_{AGC}$. In an embodiment, $\gamma_{AGC}$ may be about 1 dB, and T_AGC may be greater than an attenuator processing delay (e.g., about 50 mSec).

The steady state demodulator AGC operation may include checking the A/D power levels once every T_check seconds and adjusting the IF gain if necessary. As an example, in an exemplary process the total possible signal power at the A/D converter is determined every T_check seconds using the following equation:

$$P_{A/D} = 10 \log_{10}(P_{RCG1} + P_{rcg2}) + C1 \quad (12)$$

where C1 is a constant that relates power to A/D backoff. $P_{RCG1}$ may be calculated using the following equation:

$$P_{RCG1} = \sum_{k=0}^{K-1} 10^{P^*(k)/10} + C \qquad (13)$$

where $P_{RCG1}$ is over the K channels in RCG1 and $P^*(k)$ is the target signal power in channel number k of RCG1. $P_{RCG2}$ may be determined in a similar manner. Measurement of actual power at the A/D converter may not be required because:

1. Return link power control maintains the EIRP of each user terminal such that the signal power in channel k will be $P^*(k)$;
2. As gateway rain attenuation changes, received satellite beacon power changes and thus the target signal power $P^*(k)$ changes. Hence, the calculated power at the A/D converter ($P_{A/D}$) changes dB for dB with the rain attenuation such that the demodulator AGC is operating based on the satellite beacon power.
3. Periodic $N_o$ measurements reflect changes in RF or IF gain in the calculation of $P^*(k)$.

$P_{A/D}$ may, however, be determined by direct measurement at the A/D converter in some embodiments. Note that direct measurements may vary with load of return channel traffic and may not provide power under a condition of all carriers present.

The IF gain may be adjusted if $P_{A/D}$ (either calculated or measured directly) is not within a specified window. For example, in one embodiment, adjustment of the IF gain may be determined using the following equation:

$$|P_{A/D} - P^*_{A/D}| > \gamma_{adjust} \qquad (12)$$

where $P^*_{A/D}$ is a target signal power (when signals are present in all channels in both RCGs). $P^*_{A/D}$ may be the same quantity used in the initial demodulator AGC operation.

If an adjustment to the IF gain is required, an adjustment may be performed, for example, using the following procedure:

1. Freeze common mode (home channel) loops and differential mode (cal table) loops on all channels for both RCG1 and RCG2. This may be done by setting an error signal (Err(k)) equal to zero for all PMMs;
2. Increase the IF gain by $\Delta_{HW}$ db, where a positive value results in smaller IF;
3. New values for $P^*(k)$ may be determined using Equation (1) since $A_{now}$ has changed; and
4. Unfreeze the common mode and differential mode loops T_hold seconds after they were frozen. This ensures that subsequent loop processing does not occur until after the IF gain changes and $P^*(k)$ updates are known to take affect.

The IF gain in step 2 may be calculated using the following equation:

$$\Delta_{HW} = q_{AGC} \cdot \text{round}\left(\frac{P_{A/D} - P^*_{A/D}}{q_{AGC}}\right) \qquad (14)$$

Using this process the calculated signal power at the AGC will be approximately the same as the target signal power level.

Note that as the satellite beacon receiver AGC changes the absolute satellite beacon power changes but the normalized satellite beacon power ($B_{now}$) does not change. The satellite beacon processing described above ensures that there is no transient in $B_{now}(n)$ due to satellite beacon receiver AGC attenuation changes. As a result, there is no impact to $P^*(k)$ for any of the RCGs. For the satellite beacon receiver, changing the AGC attenuation value will change $P^*(k)$ by virtue of changing $A_{now}$ rather than through changes to $B_{now}$ (see Equation (1)).

Figure 5:
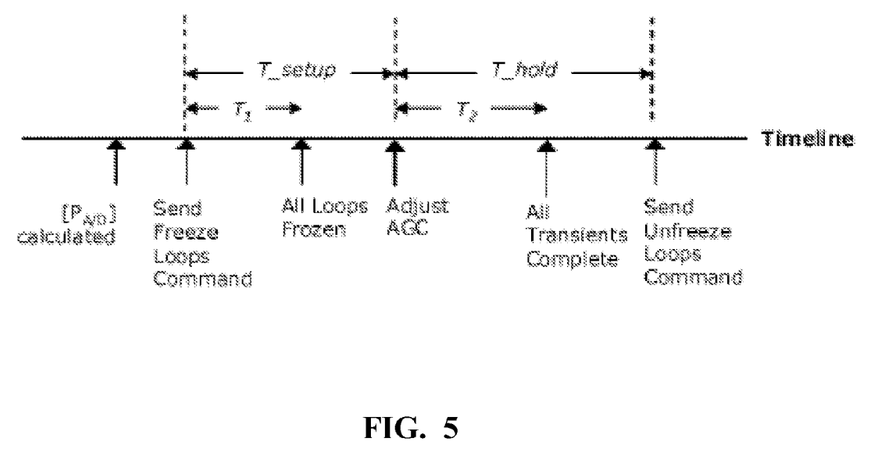
FIG. 5 is a simplified diagram showing a timeline that may be used for demodulator automatic gain control (AGC) in accordance with an embodiment of the present invention.

Due to delays in demodulator processing and queuing, there may be uncertainty as to which attenuation settings were applied for some bursts. The timeline illustrated in FIG. 5 may be used in some embodiments to make demodulator AGC changes and to reduce the uncertainty. Once it has been determined that demodulator AGC needs to be changed, a command may be sent to applicable modules to freeze the loops. $T_1$ represents the maximum time duration for the modules to freeze the loops. Demodulator AGC may be changed approximately T_setup ($>T_1$) mSec after sending the command to freeze the loops. $T_2$ represents the time duration for transients to occur in response to the AGC change. A command may be sent to unfreeze the loops T_hold ($>T_2$) mSec after the AGC change. T_setup may depend on processing speed. For example, if demodulator delay is less than about 20 mSec for a 32 byte PMM, the value of T_hold may be about 50 mSec.

(5) Channel Symbol Rate

Channel symbol rate may also be used to determine $P^*$ in accordance with an embodiment of the present invention.

Return Link Power Control

Figure 6:
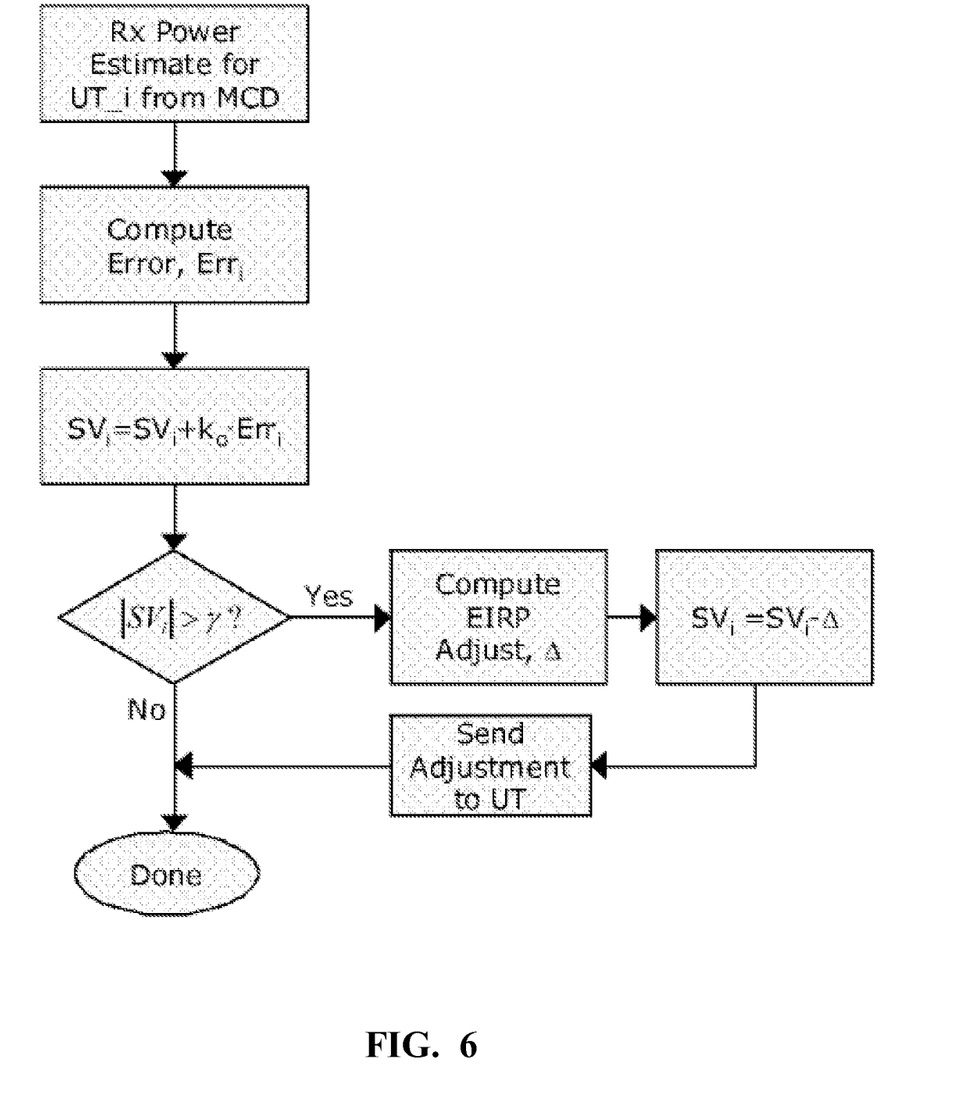
FIG. 6 is a simplified flowchart illustrating an exemplary method of return link power control in accordance with an embodiment of the present invention.

FIG. 6 is a simplified flowchart illustrating an exemplary method of return link power control in accordance with an embodiment of the present invention. The exemplary method may be performed for each estimated message signal power received (e.g., for every correctly received PMM), every X estimated message signal powers received, at specified intervals, or the like as would be appreciated by one of ordinary skill in the art. As illustrated in this example, an estimated message signal power is received for user terminal number i (labeled "Rx Power Estimate for UT_i from MCD" in FIG. 6). For TDMA operations, each user terminal 130 typically operates on a single carrier until its channel changes, so the dependence of $P^*$ on k is dropped in this example for brevity. An error ($Err_i$) may be computed using the following equations:

$$Err_i = P^* - C_1 \cdot P_i \text{ when SINR} \cdot C_2 < \text{SINR\_Max} \qquad (15)$$

$$Err_i = \text{SINR\_Max} - \text{SINR} \cdot C_2 \text{ when} \\ \text{SINR} \cdot C_2 \geq \text{SINR\_Max} \qquad (16)$$

where $P_i$ is the estimated message signal power, and $C_1$ and $C_2$ are constants to compensate for FPGA scaling. $P_i$ and SINR may be provided by one or more demodulators at the gateway 115. The term SINR_Max may represent a clamping value that is used to keep the EIRP of each user terminal 130 from exceeding a maximum value regard less of the target signal power $P^*$. The value for SINR_Max should typically be slightly higher than the expected end-to-end SINR under favorable interference conditions. If the burst was not received error free then $Err_i$ may be set to zero.

The filter state variable ($SV_i$) is compared against a threshold ($\gamma$) to determine if EIRP should be adjusted for the user terminal 130 sending the message. The threshold is typically an adjustable parameter and in one embodiment may be in the range of about 0.25 to about 0.5 dB. $k_o$ is a loop filtering parameter that may be a function of the PMM interval. A typical value for $k_o$ may be, for example, about 1 second. If an EIRP adjustment is necessary it may be computed as follows:

$$\Delta = q \cdot \text{round}\left(\frac{SV_i}{q}\right) \quad (16)$$

where q is a desired resolution of the EIRP adjustment, and $$\text{round}\left(\frac{SV_i}{q}\right)$$

rounds to the next integer value. The EIRP adjustment may be sent to the user terminal 130, or the adjustment may be used to determine an adjusted EIRP value or setting that may be sent to the user terminal 130.

Figure 7:
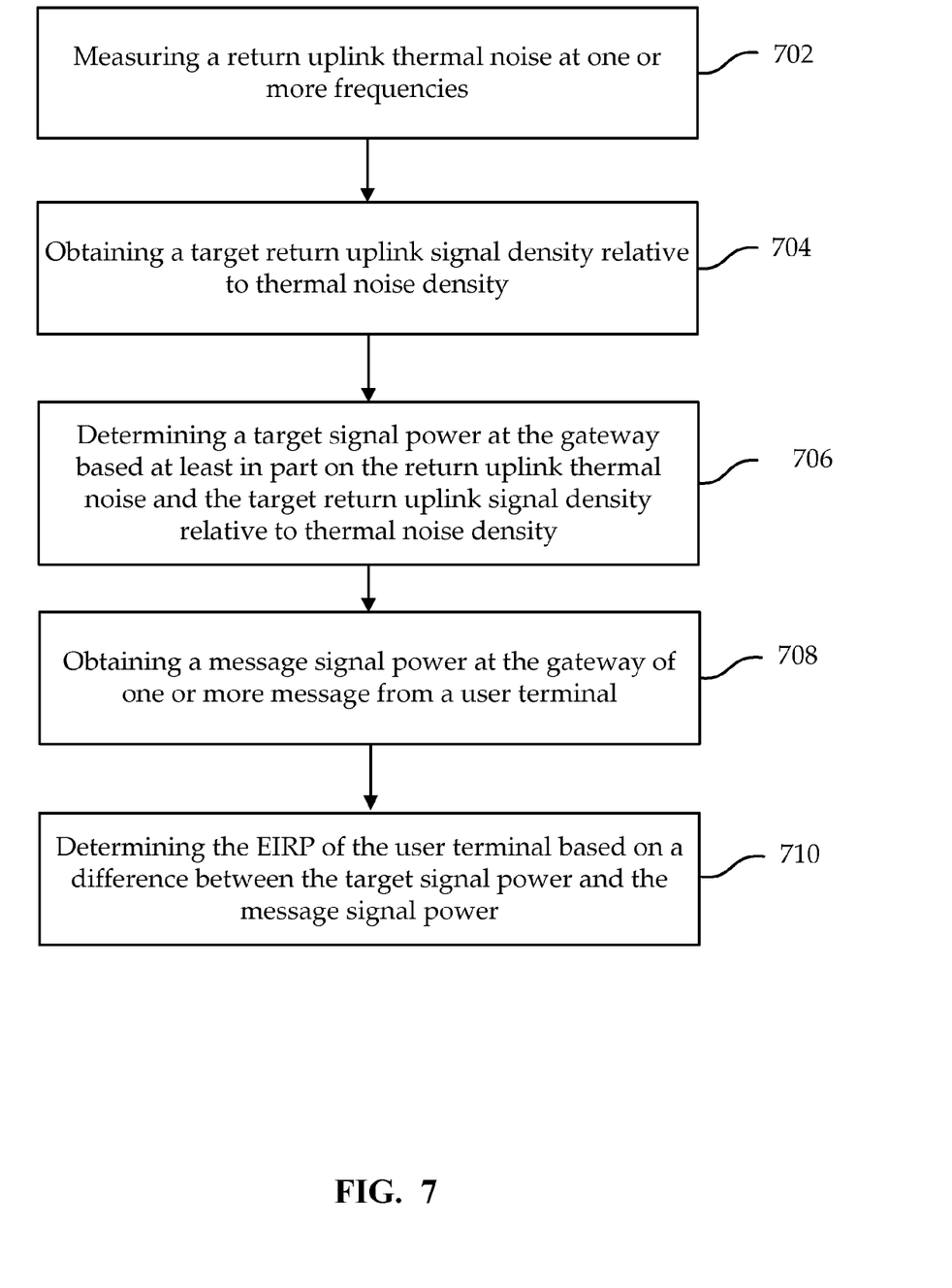
FIG. 7 is a simplified flowchart illustrating an exemplary method for determining effective isotropic radiated power (EIRP) of user terminals in a satellite communication system in accordance with an embodiment of the present invention.

FIG. 7 is a simplified flowchart illustrating an exemplary method for determining EIRP of user terminals in a satellite communication system in accordance with an embodiment of the present invention. The method includes measuring a return uplink thermal noise at one or more frequencies (702). In an embodiment, the return uplink thermal noise may be obtained at a specified frequency during a time period in which there are no transmissions in the satellite communications system at the specified frequency. The return uplink thermal noise may be obtained by making one or more total power measurements during the time period. In another embodiment, obtaining the return uplink thermal noise comprises performing a series of total power measurements and determining a minimum total power measurement from the series. The method also includes obtaining a target return uplink signal density relative to thermal noise density (704). The method also includes determining a target signal power at the gateway based at least in part on the return uplink thermal noise and the target return uplink signal density relative to the thermal noise density (706). The target signal power may be determined for one or more frequency channels. In some embodiments, the target signal power may be based on one or more additional factors such as an automatic gain control of a demodulator at the gateway, a satellite beacon signal power, and/or channel symbol rate. The method also includes obtaining a message signal power at the gateway of one or more messages from a user terminal (708). The message signal power may be measured by a demodulator at the gateway. The method also includes determining the EIRP of the user terminal based at least in part on a difference between the target signal power and the message signal power (710). The EIRP may be sent to the user terminal using, for example, a forward link transmission from the gateway.

It should be appreciated that the specific steps illustrated in FIG. 7 provide a particular method for determining EIRP of user terminals in a satellite communication system. The steps outlined above may be carried out by system software and/or hardware, and in some embodiments the steps may be continuously repeated. Also, other sequences of steps may be performed according to alternative embodiments. For example, the steps outlined above may be performed in a different order. Moreover, the individual steps illustrated in FIG. 7 may include multiple sub-steps that may be performed in various sequences as appropriate to the individual step. Furthermore, additional steps may be added or removed depending on the particular application. One of ordinary skill in the art would recognize many variations, modifications, and alternatives.

Figure 8:
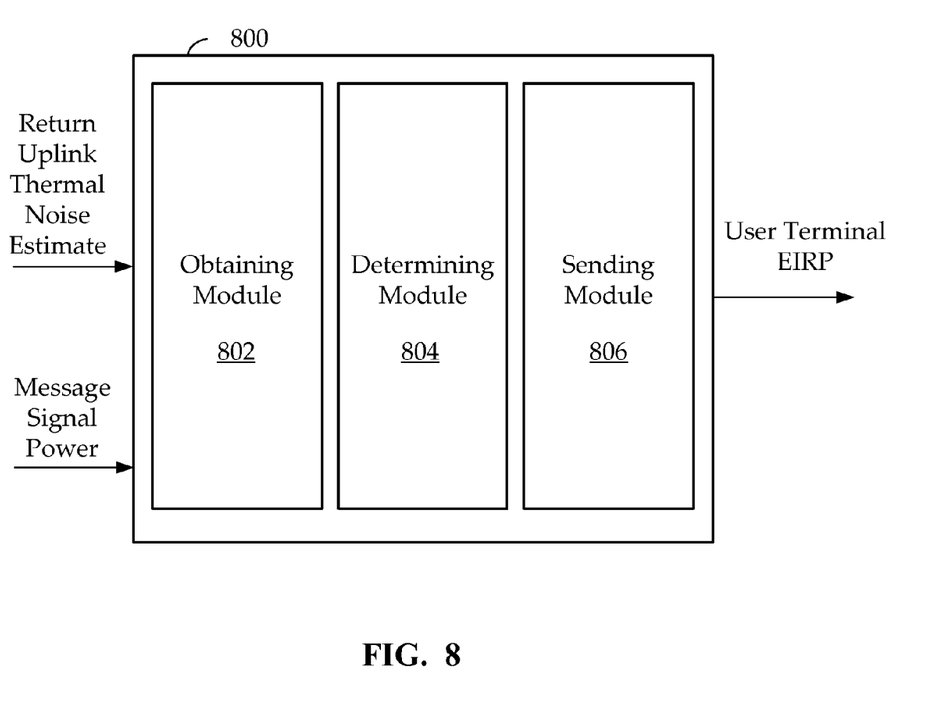
FIG. 8 is a simplified block diagram of an apparatus for determining EIRP of user terminals in a satellite communication system in accordance with an embodiment of the present invention.

FIG. 8 is a simplified block diagram of an apparatus 800 for determining EIRP of user terminals in a satellite communication system in accordance with an embodiment of the present invention. The apparatus 800 includes an obtaining module 802 configured to obtain a return uplink thermal noise estimate, obtain a target return uplink signal density relative to thermal noise density, and obtain a message signal power at the gateway of a message from a user terminal. The obtaining module 802 may also be configured to obtain a satellite beacon signal power at a beacon receiver of the gateway and/or an automatic gain control of a demodulator at the gateway. The apparatus 800 also includes a determining module 804 configured to determine a target signal power based at least in part on the return uplink thermal noise estimate and the target return uplink signal density relative to thermal noise density, and determine the EIRP of the user terminal based at least in part on a difference between the target signal power and the message signal power. The apparatus 800 may also include a sending module 806 configured to send the EIRP or a delta EIRP to the user terminal.

It should be noted that the apparatus 800 is not limited to a particular device within the satellite communications system 100. The apparatus 800 may comprise one or a combination of two or more devices. For example, the apparatus 800 may comprise a gateway command center, one or more gateways 115, or any other device or combination of devices within the satellite communications system 100.

It should be noted that the methods and apparatuses discussed throughout the specification are provided merely as examples. Various embodiments may omit, substitute, or add various procedures or components as appropriate. For instance, it should be appreciated that features described with respect to certain embodiments may be combined in various other embodiments. Furthermore, embodiments may be implemented by hardware, software, firmware, middleware, microcode, hardware description languages, or any combination thereof When implemented in software, firmware, middleware, or microcode, the program code or code segments to perform the necessary tasks may be stored in a computer-readable medium such as a storage medium. Processors may be adapted to perform the necessary tasks. The term "computer-readable medium" includes, but is not limited to, portable or fixed storage devices, optical storage devices, wireless channels, sim cards, other smart cards, and various other mediums capable of storing, containing, or carrying instructions or data.

Having described several embodiments, it will be recognized by those of skill in the art that various modifications, alternative constructions, and equivalents may be used without departing from the spirit of the invention. For example, the above elements may be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method for determining an effective isotropic radiated power (EIRP) adjustment for user terminals in a satellite communications system, the method comprising:
   determining a return uplink thermal noise estimate at a gateway, the return uplink thermal noise estimate determined at each of a plurality of different frequencies using total power measurements;
   obtaining a target return uplink signal density relative to thermal noise density based on end to end link characteristics and off-axis emissions from the user terminals;
   determining a target signal power at a gateway in the satellite communications system for one or more frequency channels, the target signal power based at least in part on the return uplink thermal noise and the target return uplink signal density relative to the thermal noise density;

obtaining a message signal power at the gateway of one or more messages from a user terminal, the message signal power determined by a demodulator at the gateway; and determining the EIRP adjustment for the user terminal based at least in part on a difference between the target signal power and the message signal power.

2. The method of claim 1 further comprising obtaining an automatic gain control of one or more demodulators at the gateway and obtaining a satellite beacon signal power at a beacon receiver of the gateway, wherein the target signal power is based at least in part on the return uplink thermal noise, the target return uplink signal density relative to the thermal noise density, the satellite beacon signal power, and the automatic gain control of the one or more demodulators.

3. The method of claim 1 further comprising sending the EIRP adjustment to the user terminal.

4. The method of claim 1 wherein obtaining the message signal power comprises measuring a signal power of the one or more message at the gateway.

5. The method of claim 1 wherein the return uplink thermal noise is determined at a specified frequency during a time period in which there are no transmissions in the satellite communications system at the specified frequency.

6. The method of claim 1 wherein the return uplink thermal noise is determined at a plurality of frequencies within a return channel group.

7. The method of claim 1 wherein determining the return uplink thermal noise comprises performing a series of total power measurements and determining a minimum total power measurement from the series.

8. The method of claim 1 wherein the target signal power is based at least in part on a channel symbol rate.

9. A method for controlling power of return link transmissions in a satellite communications system, the method comprising:

obtaining a return uplink thermal noise estimate at one or more frequencies, the return uplink thermal noise estimate based at least in part on a total power measurement from a series of total power measurements;

obtaining a target return uplink signal density relative to thermal noise density;

determining a target signal power at a gateway for one or more frequency channels, the target signal power based at least in part on the return uplink thermal noise estimate and the target return uplink signal density relative to thermal noise density;

obtaining a message signal power at the gateway of a message from a user terminal; and determining an EIRP of the user terminal based at least in part on a difference between the target signal power and the message signal power.

10. The method of claim 9 further comprising sending the EIRP to the user terminal.

11. The method of claim 9 wherein the series of total power measurements are obtained during a specified time period.

12. The method of claim 9 wherein the total power measurement is a minimum of the total power measurements.

13. The method of claim 9 wherein the total power measurement is statistically near a minimum of the total power measurements.

14. An apparatus for determining an effective isotropic radiated power (EIRP) adjustment for user terminals in a satellite communications system, comprising:

an obtaining module comprising hardware configured to:
obtain a return uplink thermal noise estimate at a gateway, the return uplink thermal noise estimate obtained at each of a plurality of different frequencies using total power measurements;
obtaining a target return uplink signal density relative to thermal noise density based on end to end link characteristics and off-axis emissions from the user terminals; and
obtain a message signal power at a gateway in the satellite communications system of a message from a user terminal;

a determining module comprising hardware configured to:
determine a target signal power at the gateway based at least in part on the return uplink thermal noise estimate and the target return uplink signal density relative to thermal noise density; and
determine the EIRP adjustment for the user terminal based at least in part on a difference between the target signal power and the message signal power.

15. The apparatus of claim 14 further comprising a sending module configured to send the EIRP adjustment to the user terminal.

16. The apparatus of claim 14 wherein the obtaining module is further configured to obtain a satellite beacon signal power at a beacon receiver of the gateway, and the determining module is further configured to determine the target signal power at the gateway for one or more frequency channels based at least in part on the return uplink thermal noise estimate, the satellite beacon signal power, and the target return uplink signal density relative to thermal noise density.

17. The apparatus of claim 14 wherein the obtaining module is configured to obtain the return uplink thermal noise estimate at a specified frequency during a time period in which there are no transmissions in the satellite communications system at the specified frequency.

18. The apparatus of claim 14 wherein the obtaining module is configured to obtain the return uplink thermal noise estimate from a series of total power measurements.

* * * * *